UNITED STATES PATENT OFFICE 2,492,182

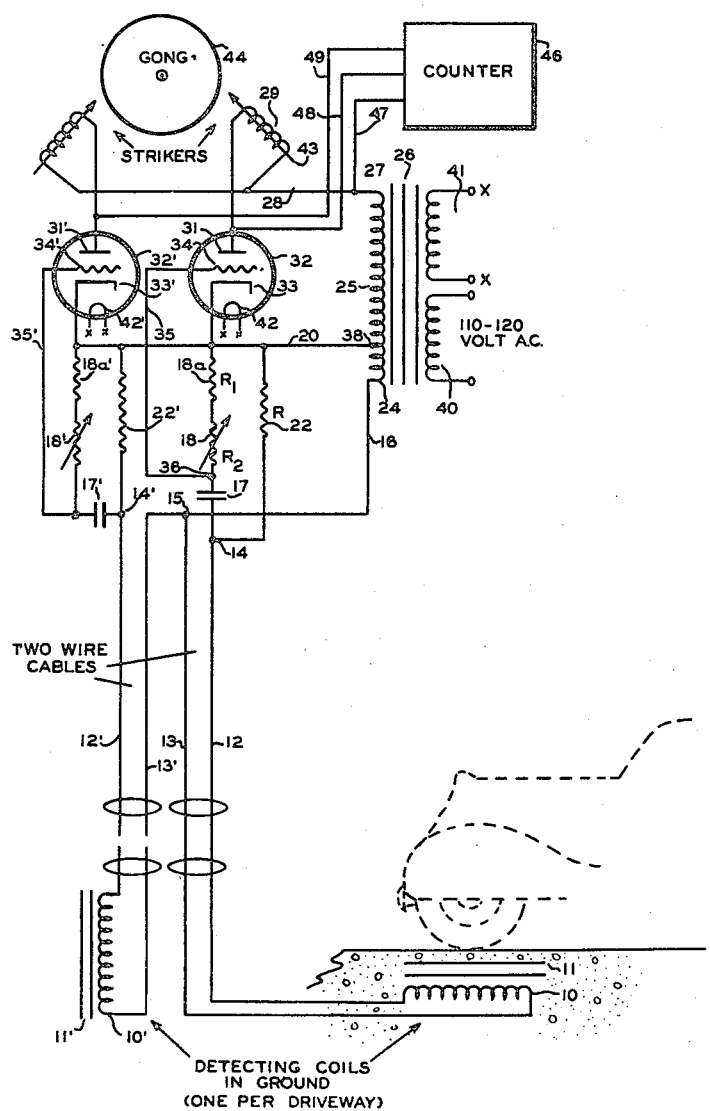

APPROACH ALARM SYSTEM

George F. Robinson, East Orange, N. J., assignor to Federal Telephone and Radio Corporation, New York, N. Y., a corporation of Delaware Application April 12, 1946, Serial No. 661,494

7 Claims. (Cl. 177—352)

This invention relates to an electrical apparatus and particularly to an annunciator system for use in detecting the presence of large masses of iron or steel. The invention has particular application where the presence of automotive vehicles is to be indicated. Thus, gasoline stations, garages, roadside stores and the like require simple and effective means for indicating when an automobile is present. In all such cases, it is desirable that the arrival of an automobile be announced in any suitable fashion, such as by a gong. It is also preferred that the annunciator action be simple and, when generating sound as with a gong, it is preferred that one sound be made irrespective of the length of time that an automobile remains in position for announcing.

The invention may also be applied to vehicle counting systems, since one response of the system is provided for one automobile irrespective of how long or short a time the automobile remains in any position.

The invention in general provides a system which is simple, utilizes standard and readily obtainable components and is rugged. A system embodying the present invention may be disposed in such a manner as to be completely protected from weather as well as from impact or abuse by any vehicles being counted. The system may be installed cheaply with relatively unskilled labor and requires a minimum of maintenance.

In accordance with the invention, there is provided a reactance element whose value in a circuit is a function of the absence or presence of the object whose presence is to be announced. Thus, the reactance element may take on the form of a simple inductance whose value may be varied over wide limits by virtue of the absence or presence of an automobile, truck or other large mass of iron. While the variation in value of reactance may be used in a number of ways, it is preferred to utilize this in connection with a grid-controlled gaseous discharge device readily available in the market under the tradename Thyratron, as an example. As is well known, such grid-controlled gas discharge devices may have their conducting condition controlled by the potential on the control electrodes. In accordance with the invention, a grid-controlled gas discharge device is connected in an alternating current circuit in such a manner that, under one condition of reactance, the control grid potential is 180 degrees out of phase with the anode potential. At another condition of the reactance, the phase angle between the grid potential and anode potential is changed so that a gaseous discharge may occur during each portion of a cycle during the existence of the changed conditions at the reactance.

A particularly simple form of the invention makes use of a solenoid whose inductance has one value when an automobile or truck is immediately adjacent the same and has a smaller value when no vehicle having substantial iron is near. By providing a phase changing network in a grid-controlled gas discharge device system, the change in inductance will change the condition of the device from non-conducting to conducting. By having the system so designed that the gas discharge device is non-conducting during the absence of an automobile and becomes conducting upon the presence of an automobile in proximity to the inductance, a simple and economical annunciator system may be provided. Thus, any announcing means, such as a simple gong, may have an actuating coil connected through a grid-controlled gas discharge device. When the device becomes conducting, the gong is struck a single blow and thereafter remains silent. Instead of a gong, it is evident that counting mechanism or more complicated annunciators may be operated.

For a more thorough understanding of the invention, reference will now be made to the drawing wherein a circuit diagram embodying a preferred form of the invention is given. It will be understood, however, that variations and changes may be made by anyone skilled in the art without departing from the spirit of the invention except as limited by the claims.

Referring, therefore, to the drawing, 10 shows a solenoid consisting of a long coil of wire having an iron core 11. Core 11 may be a bundle of iron wires, and the solenoid may have any desired length. Thus, as used for detecting automobiles, solenoid 10 may have a length of about nine inches or longer. The solenoid preferably has a large ratio of length to diameter. Solenoid 10 may be disposed several inches under ground and is preferably disposed so that the axis of the solenoid is generally parallel to the line of travel of an automobile.

It is understood, however, that the dimensions of the solenoid together with its disposition are merely exemplary. The physical and magnetic properties of the solenoid when near an automobile will be determined in a substantial measure by the physical distance from the iron of the automobile. Thus, it is possible to dispose the solenoid on the surface of the ground or even above ground, in which case the dimensions and size of the solenoid may be reduced. Solenoid 10 is connected by a cable consisting of wires 12 and 13 to junctions 14 and 15, the latter being on lead 16. Junction 14 is connected through condenser 17 and variable resistor 18 to lead 20. Junction 14 is also connected through resistor 22 to lead 20.

Lead 16 goes to terminal 24 of winding 25 of power supply transformer 26. Winding 25 has its other terminal 27 connected to lead 28. From lead 28, a connection is made to one terminal of solenoid winding 29, the other terminal of which goes to anode 31 of grid-controlled gas tube 32. Gas tube 32 has cathode 33 connected to lead 20. Tube 32 has control grid 34 connected by lead 35 to junction 36 between condenser 17 and resistor 18.

Lead 20 goes to tap 38 on winding 25. Transformer 26 has primary 40 for energizing the same, this primary being adapted to be supplied from any suitable alternating current source such as the conventional 60 cycle, 110 volt supply line. Transformer 26 has filament winding 41 for energizing heater 42 of grid-controlled gas tube 32. It is understood, however, that gaseous discharge tube 32 may be of the cold cathode variety, in which case no filament winding would be required.

Solenoid winding 29 has plunger 43 of iron or other magnetic material so disposed that, when winding 29 is energized, plunger 43 is pulled into the solenoid to strike gong 44.

The operation of the system is as follows. Assuming that no automobile is present, solenoid 10 will have some value of inductance. The potential across the solenoid winding will lead the current through the solenoid winding by some small phase angle. By virtue of the connections herein, the potential upon control grid 34 of gas tube 32 will be 180 degrees out of phase with respect to the anode potential. Resistor 18 may be adjusted to compensate for any variations in inductance of solenoid 10 due to manufacturing tolerances or the like. When an automobile is over solenoid 10, the change in inductance of the solenoid is sufficiently great to destroy the balance of the system. In such a case, the current lags the voltage in solenoid 10 by an increased phase angle. This increased phase angle provides some potential at control grid 34 in phase with the anode potential. Assuming that the control grid and anode potentials are of the proper value, gas tube 32 will fire for a predetermined portion of a cycle. The firing of tube 32 will complete a circuit through gong solenoid 29. With proper design, striker 43 will be pulled up into solenoid 29 and be maintained in that position to result in a single stroke on the gong. When the automobile leaves, detecting solenoid 10 has its inductance reduced, and the system resumes its normal stand-by condition.

The relative value of resistor 22 and inductance 10 may be varied within wide limits. It is only necessary that the variation of inductance of solenoid 10 be great enough so that a substantial change in phase angle occurs. In practice, resistor 22 and solenoid 10 may be designed to draw but little current. Condenser 17 may have any value within wide limits. Preferably, the reactance of condenser 17 at 60 cycles should have the same ratio to the value of resistance 18 as the stand-by reactance of solenoid 10 bears to resistor 22. Inasmuch as condenser 17 may have a small capacitance for the sake of economy, resistor 18, in practice, may be quite a bit larger than resistor 22. Instead of having the variable resistor as one unit, it is possible to provide 18a as a fixed portion of the total resistance and have part 18 as a variable resistor.

In order to reduce the sensitivity of the detecting system to stray effects, it is preferred to so design the components that, when an automobile is present over the detecting coil, the phase angle of 180 degrees between control grid and anode is changed substantially. The various potentials will be determined in part by the constants of the system, the change in inductance of solenoid 10 and the breakdown characteristics of gas tube 32. While gas tube 32 is shown as having heaters for the cathode, it is possible to rely upon a cold cathode type of device.

Additional indicating units may be added as desired. Thus, an additional unit is shown, the corresponding parts having primed numbers and sharing gong 44. In addition to the gong, counter 46 may be provided for integrating the number of times the various units operate. Thus, counter 46 may be connected by common lead 47 to lead 28. Leads 48 and 49 are connected to anodes 31 and 31' respectively. Every time a gas tube fires, the counter is actuated. Inasmuch as electrically-operated counters are well known, a detailed description of one is deemed to be unnecessary.

What is claimed is:

1. A system for detecting the presence of a substantial mass of magnetic metal, said system comprising a reactance having a variable value depending upon the presence or absence of such a mass, an electron discharge device having cathode, anode and control grid, a circuit including said reactance connected between said grid and cathode, means for impressing alternating potentials in a pre-determined amplitude relation upon said anode, grid and cathode, means providing a 180 degree phase difference between the potentials impressed upon the grid and anode when said reactance has one value, and another phase difference when said reactance has a different value, said discharge device being substantially non-conductive when said phase difference is 180 degrees and substantially conductive when said phase difference has another value, and means controlled by said electron discharge device for indicating such a change.

2. A system for detecting a substantial mass of magnetic metal comprising an inductive reactance having a variable value depending upon the presence or absence of said metallic mass, an electron discharge device having cathode, grid and anode electrodes, a circuit including said inductive reactance between the grid and cathode, means for applying alternating potentials in a pre-determined amplitude relation to said grid and anode in opposed phase for one value of said reactance, said reactance when changing to another value being adapted to change the phase angle between the grid and anode potential and said discharge device being substantially non-conductive when the applied potentials are in opposed phase and substantially conductive when a phase angle is changed, and means connected in the cathode-anode circuit for indicating the change in inductive reactance.

3. A system for detecting a substantial mass of magnetic metal, said system comprising an inductance having a variable value depending upon the absence or presence of said mass of metal, a gaseous discharge tube having cathode, control grid and anode, a circuit including said inductance between said grid and cathode, means for applying alternating potentials in a pre-determined amplitude relation and in opposed phase to said grid and anode respectively to prevent firing of said tube, said opposed phase condition existing only when said inductance assumes one value, said two potentials being adapted to vary their phase relationship with a substantial variation of inductance and cause firing of said tube and indicating means in said cathode-anode circuit controlled by the space current through said tube.

4. A system for detecting a substantial mass of iron, said system comprising an inductance having a minimum value when no iron is present and increasing when a mass of iron is present, a gaseous discharge tube comprising a cathode, control grid and anode, a circuit including said inductance connected between said cathode and grid, means for applying alternating potentials in a pre-determined amplitude relation to said grid and anode respectively in opposed phase to prevent firing of said tube, said circuit including means for balancing said circuit so that the grid and anode potentials are in opposed phase when said inductance has its minimum value, said inductance shifting the phase relationship between said grid and anode potentials to cause firing of said device when detecting iron and means in said anode-cathode circuit for indicating a firing condition of said tube.

5. The system of claim 4 wherein said indicating means includes an energizing winding connected in series in said anode-cathode circuit and a one-stroke gong actuated by said energizing winding.

6. A system for detecting an automobile or a like vehicle, said system comprising a solenoid having a minimum value of inductance when no automobile is present and having a substantially higher value of inductance when an automobile is disposed near the same, a gas discharge tube having cathode, control grid and anode, a first resistance connected between said grid and cathode, a condenser and second resistor in series between said grid and cathode respectively, a first transformer winding in series with said solenoid winding across said second resistor, a second transformer winding between said cathode and anode, said two transformer windings forming secondaries of a transformer, said transformer having a primary, said grid to cathode circuit being balanced so that when no automobile is present the grid potentials are in a pre-determined relation and in opposed phase to the anode potentials and prevent the tube from firing, said solenoid changing its inductance upon the presence of an automobile to change the phase relationship between the grid and anode potentials whereby the tube fires for at least a portion of each cycle, and a load in said anode transformer circuit.

7. A system for detecting the presence of a substantial mass of magnetic material, said system comprising a reactance having a variable value depending upon the presence or absence of such a mass, an electron discharge device having cathode, anode, and grid electrodes, a circuit including said reactance connected between said cathode and another of said electrodes, means for impressing alternating potentials in a pre-determined amplitude relation upon said electrodes, means providing a 180 degree phase difference between the potentials impressed upon the grid and anode when said reactance has one value and another phase difference when said reactance has a different value, said discharge device being substantially non-conductive when said phase difference is 180 degrees and substantially conductive when said phase difference has another value, and means controlled by said electron discharge device for indicating such a change.

GEORGE F. ROBINSON.

REFERENCES CITED

The following references are of record in the file of this patent:

UNITED STATES PATENTS

| Number | Name | Date |
|---|---|---|
| 1,654,949 | Toulon | Jan. 3, 1928 |
| 1,950,741 | Nein et al. | May 13, 1934 |
| 2,007,715 | Glock | July 9, 1935 |
| 2,292,397 | Overbeck | Aug. 11, 1943 |
| 2,331,418 | Nolde | Oct. 12, 1943 |
| 2,349,987 | Place | May 30, 1944 |
| 2,360,885 | Metcalf | Oct. 24, 1944 |